(12) United States Patent
Noda et al.

(10) Patent No.: US 8,032,769 B2
(45) Date of Patent: Oct. 4, 2011

(54) CONTROLLING APPARATUS, CONTROLLING METHOD, COMPUTER READABLE MEDIUM, IMAGE FORMING APPARATUS AND INFORMATION PROCESSING APPARATUS

(75) Inventors: Goro Noda, Ebina (JP); Kouhei Hashimoto, Ebina (JP); Shinji Ota, Ebina (JP); Masahiko Harada, Ebina (JP); Toru Hada, Ebina (JP); Kohei Tanaka, Ebina (JP); Atsushi Takeshita, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 804 days.

(21) Appl. No.: 12/053,331

(22) Filed: Mar. 21, 2008

(65) Prior Publication Data
US 2009/0077399 A1 Mar. 19, 2009

(30) Foreign Application Priority Data
Sep. 13, 2007 (JP) ................................ 2007-238009

(51) Int. Cl.
G06F 1/00 (2006.01)
G06F 1/26 (2006.01)
G06F 1/32 (2006.01)

(52) U.S. Cl. ........ 713/320; 713/300; 713/321; 713/323; 713/324

(58) Field of Classification Search .................. 713/300, 713/320, 321, 323, 324
See application file for complete search history.

(56) References Cited

U.S. PATENT DOCUMENTS

| | | | |
|---|---|---|---|
| 2004/0187134 A1* | 9/2004 | Suzuki | 718/102 |
| 2005/0240786 A1* | 10/2005 | Ranganathan | 713/320 |
| 2006/0140140 A1* | 6/2006 | Fuccello | 370/311 |
| 2006/0259803 A1* | 11/2006 | Edwards et al. | 713/320 |
| 2006/0288243 A1* | 12/2006 | Kim | 713/300 |
| 2007/0136615 A1* | 6/2007 | Son et al. | 713/300 |
| 2007/0220293 A1* | 9/2007 | Takase | 713/320 |
| 2008/0072086 A1* | 3/2008 | Kim | 713/323 |
| 2008/0194300 A1* | 8/2008 | Rofougaran | 455/574 |
| 2010/0048139 A1* | 2/2010 | Seo et al. | 455/67.11 |

FOREIGN PATENT DOCUMENTS

| | | |
|---|---|---|
| JP | 2004-101919 A | 4/2004 |
| JP | 2005-031333 A | 2/2005 |

* cited by examiner

*Primary Examiner* — Vincent Tran
(74) *Attorney, Agent, or Firm* — Sughrue Mion, PLLC

(57) ABSTRACT

The controlling apparatus is provided with: a memory that stores application software; a setting part that sets an operational manner related to power consumption of an apparatus running the application software, corresponding to the application software stored in the memory; and a controller that controls the power consumption of the apparatus according to the operational manner set by the setting part.

19 Claims, 13 Drawing Sheets

| TIME SLOT | OPERATIONAL MODE |
|---|---|
| 0:00–7:00 | OFF |
| 7:00–9:00 | LOW-POWER MODE |
| 9:00–12:00 | STAND-BY MODE |
| 12:00–13:00 | OFF |
| 13:00–20:00 | STAND-BY MODE |
| 20:00–22:00 | SLEEP MODE |
| 22:00–0:00 | OFF |

FIG.4

| TIME SLOT | OPERATIONAL MODE |
|---|---|
| 0:00-7:00 | OFF |
| 7:00-9:00 | LOW-POWER MODE |
| 9:00-12:00 | STAND-BY MODE |
| 12:00-13:00 | OFF |
| 13:00-20:00 | STAND-BY MODE |
| 20:00-22:00 | SLEEP MODE |
| 22:00-0:00 | OFF |

FIG.5

| OPERATIONAL MODE | POWER CONSUMPTION PER UNIT TIME (Wh) |
|---|---|
| STAND-BY MODE | aa |
| LOW-POWER MODE | bb |
| SLEEP MODE | cc |
| IMAGE-FORMING OPERATIONAL MODE | dd |
| IMAGE READER | ee |
| FAX | ff |

CONTROLLING APPARATUS, CONTROLLING METHOD, COMPUTER READABLE MEDIUM, IMAGE FORMING APPARATUS AND INFORMATION PROCESSING APPARATUS

CROSS REFERENCE TO RELATED APPLICATIONS

This application is based on and claims priority under 35 USC §119 from Japanese Patent Application No. 2007-238009 filed Sep. 13, 2007.

BACKGROUND

1. Technical Field

The present invention relates to a controlling apparatus, a controlling method, a computer readable medium storing a program, an image forming apparatus and an image forming apparatus.

2. Related Art

An image forming apparatus and the like, such as a printer, receive image data and the like from a terminal connected via, for example, a network or the like and perform printing. At this time, if image data or the like are not inputted over a given time period or longer, the image forming apparatus and the like are generally controlled to shift to a power saving state in which the power consumption is kept at a low level.

However, use environments of the image forming apparatus and the like such as a usage frequency, a service time slot and the like are different respectively. For this reason, each image forming apparatus and the like has its own suitable timing for shifting to and returning from the power-saving mode and an operational manner regarding the power saving mode such as power consumption levels to be set at that time.

SUMMARY

According to an aspect of the invention, there is provided a controlling apparatus including: a memory that stores application software; a setting part that sets an operational manner related to power consumption of an apparatus running the application software, corresponding to the application software stored in the memory; and a controller that controls the power consumption of the apparatus according to the operational manner set by the setting part.

BRIEF DESCRIPTION OF THE DRAWINGS

Exemplary embodiment(s) of the present invention will be described in detail based on the following figures, wherein:

FIG. 4 is a diagram showing an example of the operational pattern for the operational mode which is included in the additional information in the application software;

FIG. 5 is a diagram showing an example of the information on power consumption per unit time in each of the operational modes stored in the power data memory;

DETAILED DESCRIPTION

Hereinafter, referring to accompanying drawings, exemplary embodiments of the present invention are described in detail.

First Exemplary Embodiment

Figure 1:
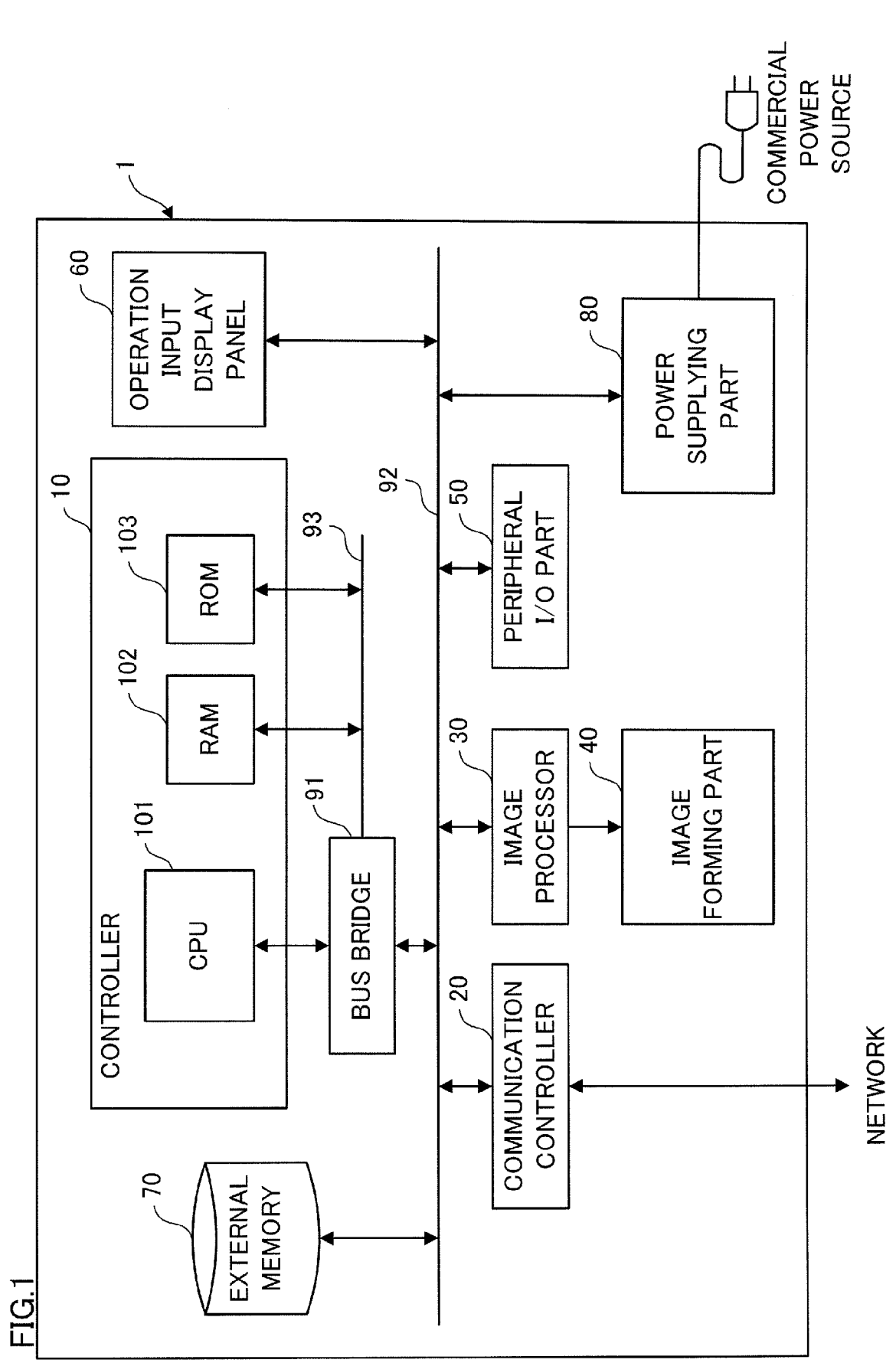
FIG. 1 is a diagram showing an overall configuration of an image forming apparatus equipped with a controlling apparatus to which the first exemplary embodiment is applied.

FIG. 1 is a diagram showing an overall configuration of an image forming apparatus equipped with a controlling apparatus to which the first exemplary embodiment is applied. An image forming apparatus 1 shown in FIG. 1 is provided with a controller 10 as an example of a controlling apparatus (a controlling device) that controls the operation of the image forming apparatus 1 according to various programs, and a communication controller 20 that controls the communication to and from a network. The image forming apparatus 1 is also provided with an image processor 30 that analyzes a print job data transmitted via the network from, for example, a terminal and executes various processings on an image data included in the print job data, and an image forming part 40 that forms an image on a medium (a paper sheet) based on the image data on which various processes have been executed in the image processor 30.

Here, a communication line, a Local Area Network (LAN), a Wide Area Network (WAN), the Internet and the like are used as the network. The communication line may include a telephone line and a satellite communication channel (for example, a space transmission line for Digital Satellite Broadcasting). Further, as the image forming part 40, for example, an electro-photographic image forming engine may be used.

The image forming apparatus 1 is also provided with a peripheral input/output (I/O) part 50 that controls transmission and reception of data and signals to and from various functional parts. As the various functional parts, for example, an image reader composed of a scanner or the like, a facsimile (FAX) that transmits and receives an image via a public line, a card reader that recognizes an IC card or a magnetic card and the like which serves as, for example, a key for authenticating the authority of permission for the use of the image forming apparatus 1, and a data output part that outputs the image data read by, for example, the image reader to a memory such as a universal serial bus (USB) memory and the like are connected to the peripheral I/O part 50, for example.

The image forming apparatus 1 further includes an operation input display panel 60, as an example of a change receiving part, an instruction input receiving part, and a target value input receiving part, which is composed of, for example, a touch panel that displays various information and receives operation input from a user.

The image forming apparatus 1 still further includes a power supplying part 80. The power supplying part 80 converts, for example, a 100 V power supplied from a commercial power source to a predetermined voltage (for example, 24 V, 12 V, and 5 V) and then supplies the power at the predetermined voltage to the respective units in the image forming apparatus 1 under control of the controller 10.

The image forming apparatus 1 is further provided with an external memory 70 as an example of a memory composed of, for example, a hard disk that stores programs including various kinds of application software and a variety of data such as image data and the like. Herein, the term "application software" refers to software designed so as to execute a specific function such as document creation or image data processing and the like.

Here, the communication controller 20, the image processor 30, the peripheral I/O part 50, the operation input display panel 60, the external memory 70, and the power supplying part 80 are connected to an external bus 92. The controller 10 is connected to the external bus 92 via a bus bridge 91. As a result, the controller 10 is connected to the communication controller 20, the image processor 30, the peripheral I/O part 50, the operation input display panel 60, the external memory 70, and the power supplying part 80 so as to transmit and receive signals and data with each other.

As shown in FIG. 1, the controller 10 includes a CPU 101 that performs computation when the operation control of the image forming apparatus 1 is executed, a RAM 102 that is used as a working memory and the like for the CPU 101, and a ROM 103 that stores various programs and the like executed by the CPU 101. They are connected to each other via an internal bus 93 that is connected to the bus bridge 91.

The program including various application software executed in the controller 10 are loaded and provided to the ROM 103 from, for example, a hard disk and the like as the external memory 70, when the image forming apparatus 1 is started up, for instance. Further, as another exemplary embodiment of the provision, there is one in which the program is provided in a state where the program is stored in advance in the ROM 103. Furthermore, when the controller 10 is provided with the ROM 103 that is rewritable such as EEPROM and the like, there is an exemplary embodiment in which only the program is provided and installed in the ROM 103 after the controller 10 is assembled. Moreover, there is an exemplary embodiment in which the program is transmitted to the controller 10 via the network such as the Internet and installed in the ROM 103 of the controller 10. In addition, there is an exemplary embodiment in which the program in a state where the program is stored in advance in a storage medium such as a CD-ROM and the like.

Next, the operational modes set in the image forming apparatus 1 according to the first exemplary embodiment are described. The image forming apparatus 1 is configured so that, as operational modes, an "image-forming operational mode", a "stand-by mode", a "low-power mode" and a "sleep mode" are set for improving power-saving effects.

The image-forming operational mode is an operational mode in which an image forming operation for the image data and the like is executed. The stand-by mode is an operational mode in which a state of the on-demand response to the input of image data and the like is set. In the image forming operation mode and the stand-by mode, the power is supplied from the power supplying part 80 to all the functional parts in the image forming apparatus 1.

The low-power mode is an operational mode that is set when no data such as an image data is inputted during a first time period, for example. In the low-power mode, the power supply from the power supplying part 80 to, for example, the image processor 30, the image forming part 40, the various functional parts connected to the peripheral I/O part 50, the operation input display panel 60 and the like is stopped. On the other hand, the power supply is continued to the controller 10, the communication controller 20 and the like that are on standby for the input of the data such as an image data.

The sleep mode is an operational mode that is set when no data such as image data is inputted during a second time period which is longer than the first time period. In the sleep mode, the power supply from the power supplying part 80 to all the functional parts including the CPU 101 of the controller 10 is stopped.

Figure 2:
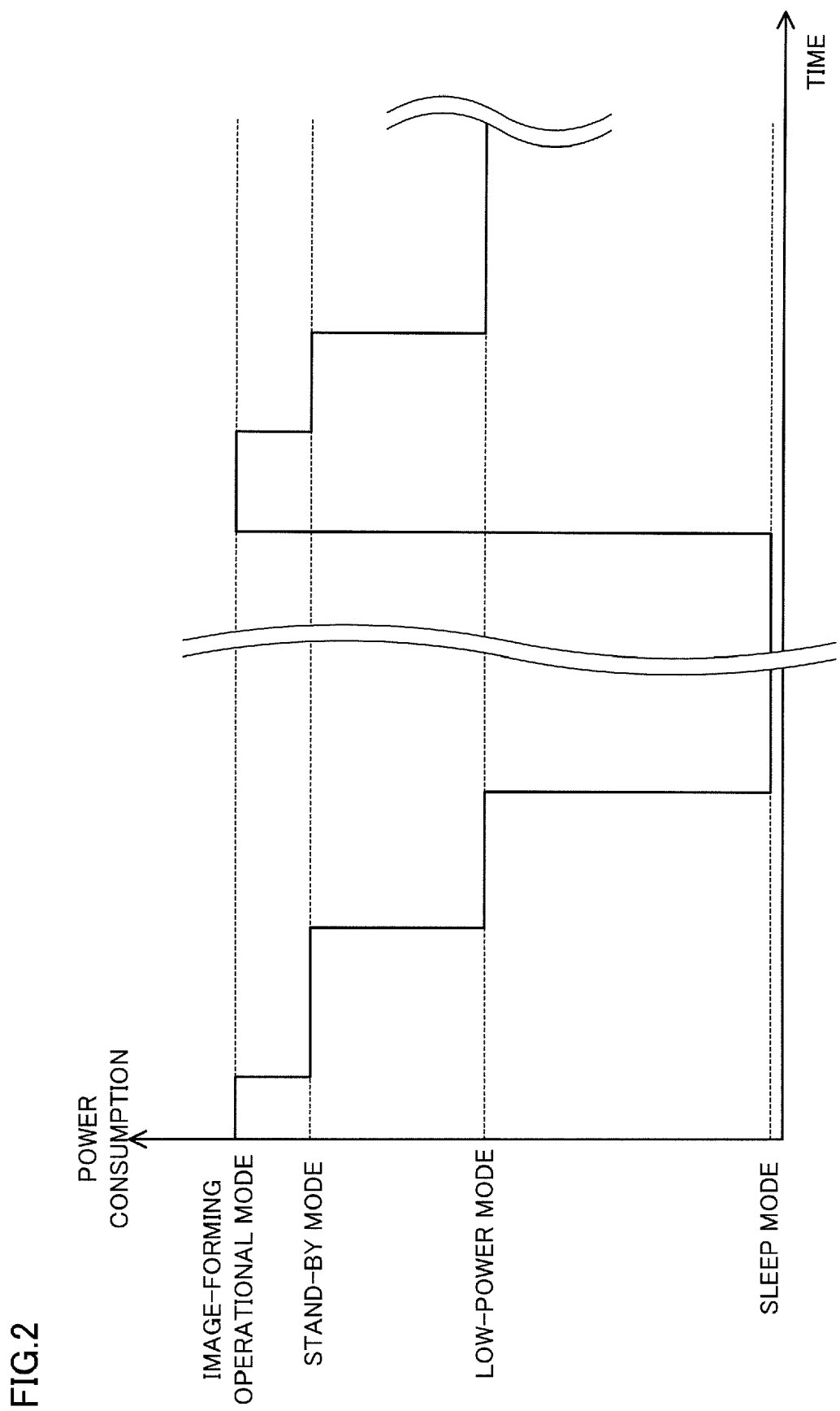
FIG. 2 is a diagram explaining the operational modes to be set in the image forming apparatus.

FIG. 2 is a diagram explaining the operational modes to be set in the image forming apparatus 1.

As shown in FIG. 2, in the image forming apparatus 1, the image-forming operational mode and the stand-by mode that consume a large amount of the power which is required for the image-forming operation, the low-power mode that consumes lower power than those of the image forming mode and the stand-by mode but returns to the image-forming operational mode in a relatively short period of time, and the sleep mode that consumes extremely low power and requires a relatively long time to return to the image-forming operational mode are appropriately set depending on the time until the input of the image data and the like. Accordingly, the power-saving effects of the image forming apparatus 1 may be improved.

Subsequently, the control of the operational modes by the controller 10 according to the first exemplary embodiment is described.

Figure 3:
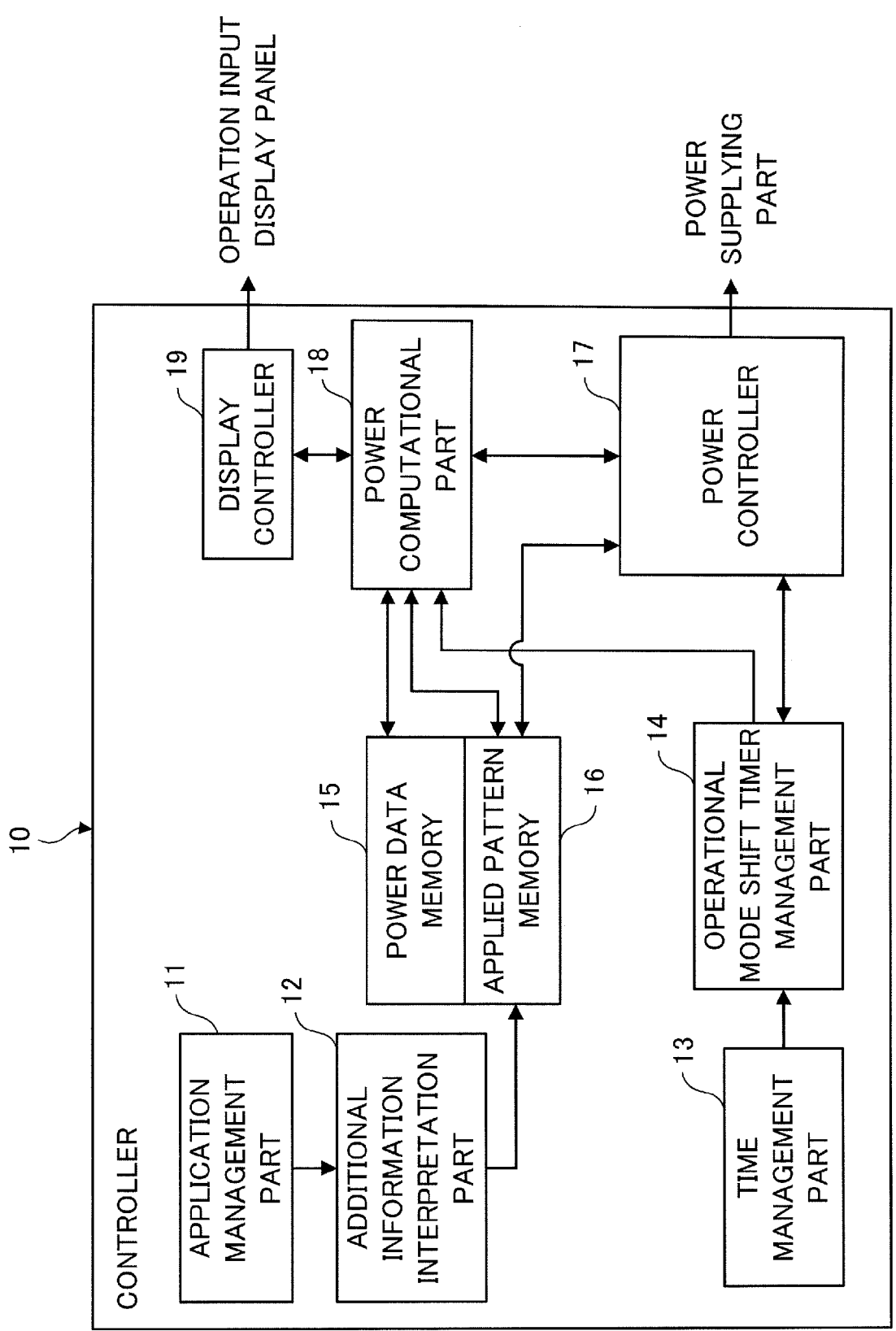
FIG. 3 is a block diagram explaining a functional configuration for controlling the operational modes by the controller.

First, FIG. 3 is a block diagram explaining a functional configuration for controlling the operational modes by the controller 10. As shown in FIG. 3, the controller 10 is provided with an application management part 11, an additional information interpretation part 12, a time management part 13, an operational mode shift timer management part 14, a power data memory 15, an applied pattern memory 16, a power controller 17, a power computational part 18 and a display controller 19.

The application management part 11 manages addition, deletion and change of the application software that are performed in the external memory 70. When the application software is added to the external memory 70, the application management part 11 transmits the additional information accompanying the application software to the additional information interpretation part 12.

The additional information interpretation part 12 acquires the additional information accompanying the application software from the application management part 11. Then it analyzes the acquired additional information and extracts an operational pattern indicated by the application software for the operational modes.

In other words, all or some of the additional information of the application software executed in the controller 10 includes information indicating an operational pattern that is suitable for the application software ("operational pattern indicating information"), which causes the application software to function effectively. The additional information interpretation part 12 extracts an operational pattern for the operational mode indicated by the added application software based on the operational pattern indicating information. The information on the extracted operational pattern for the operational mode is transmitted to the applied pattern memory 16.

Then, the applied pattern memory 16 stores the information on the operational pattern for the operational mode transmitted from the additional information interpretation part 12.

Here, the term "operational pattern for the operational mode" refers to an example of the operational manner related to the power consumption, and for instance, a time allocation pattern of the operational modes, in which each of the time slots is assigned each operational mode on a daily basis. FIG. 4 is a diagram showing an example of the operational pattern for the operational mode which is included in the additional information in the application software.

In the example shown in FIG. 4, the following operational pattern is set as operational modes suitable for the added application software. That is, in a time slot from 0:00 to 7:00, an operational mode in which the image forming apparatus 1 is powered off is set. The "low-power mode" in a time slot from 7:00 to 9:00, the "stand-by mode" in a time slot from 9:00 to 12:00, an operational mode in which the image forming apparatus 1 is powered off, in a time slot 12:00 to 13:00, the "stand-by mode" in a time slot from 13:00 to 20:00, the "sleep mode" in a time slot from 20:00 to 22:00, and an operational mode in which the image forming apparatus 1 is powered off, in a time slot from 22:00 to 0:00, are set respectively.

One of the operational modes set by the operational pattern for the operational mode as shown in, for example, FIG. 4 is not shifted to the other operational modes with a level of power consumption lower than that of the set operational mode in each time slot. In other words, in the time slot assigned the "stand-by" mode, the operational mode is not shifted to the "low-power mode" or the "sleep mode" even though the time period, for which no image data or the like is inputted, exceeds the first or second time period. Accordingly, when such operational pattern is set, executing the operational pattern is given priority over the aforementioned rule for shifting to the "low-power mode" or "stand-by mode".

For example, when the added application software has a configuration based on a communication protocol such as Simple Network Management Protocol (SNMP), if shifting to the "sleep mode" is permitted in a time slot in which packets sent from the SNMP are frequently received, the application software may fail to accommodate effectively the packets sent from the SNMP in some cases. In contrast, for example, in the time slot assigned the "stand-by mode", this situation is avoided and it is ensured that the application software accommodates the packets sent from the SNMP.

In this way, when the application software is used, the operational pattern for the operational mode, which is considered to reduce the power consumption of the image forming apparatus 1 effectively and to cause the application software to function effectively, based on various factors such as the usage frequency of the application software in each time slot, is provided for the added application software as the additional information.

It should be noted that the operational pattern for the operational mode may be set not only on a daily basis but also on a weekly basis and with different settings depending on the day of the week. Further, the operational pattern may be set in various manners, for example, taking seasonal factors into consideration.

In addition to the manner in which the operational pattern for the operational mode is included in the additional information provided for the application software, a configuration in which plural patterns for the projected operational patterns of the operational modes are stored in advance in the applied pattern memory 16 and information indicating any one of the plural operational patterns is included in the additional information in the application software may be applied. In this case, the operational pattern indicating information extracted from the additional information specifies one of the plural operational patterns which are the operational patterns for the operational modes stored in the applied pattern memory 16. Accordingly, the applied pattern memory 16 serves as an example of an operational manner memory.

Alternatively, part of the application software may be composed of the additional information and the operational pattern indicating information may be included in the application software itself.

The time management part 13 which includes of a real time clock (RTC) that keeps time and day of the week transfers the information on the kept time and day of the week to the operational mode shift timer management part 14.

The operational mode shift timer management part 14 is a functional part that manages the time when one operational mode shifts. Specifically, based on the information on time and day of the week acquired from the time management part 13, the operational mode shift timer management part 14 counts the first time period set as a shifting time period to the aforementioned low-power mode and the second time period set as a shifting time period to the sleep mode, and informs them to the power controller 17 and the power computational part 18.

The power controller 17, which is an example of a controller, acquires information on the operational pattern for the operational mode from the applied pattern memory 16. Then, the power controller 17 controls the power supply to the respective parts in the image forming apparatus 1 from the power supplying part 80 (see FIG. 1) according to the acquired information on the operational pattern for the operational mode. Accordingly, the power controller 17 serves as a setting part that sets the operational manner related to power consumption, and as a controller that controls power consumption depending on the operational manner.

In this case, when image forming operation is performed in the time slot assigned, for example, the "low-power mode" or the "sleep mode", the timing for shifting to each operational mode is set based on the information on the first time period or the second time period counted by the operational mode shift timer management part 14.

The power data memory 15 stores information on power consumption per unit time of the image forming apparatus 1, for example, when the "stand-by mode", "low-power mode", and "sleep mode" are set respectively.

FIG. 5 is a diagram showing an example of the information on power consumption per unit time in each of the operational modes stored in the power data memory 15. As shown in FIG. 5, the power data memory 15 stores the information on power consumption per unit time of the image forming apparatus 1 when the "stand-by mode", "low-power mode", and "sleep mode" are set respectively. In the example shown in FIG. 5, in addition to the operational modes, information on power consumption per unit time in the "image-forming operational mode" or power consumption per unit time of, for example, the an image reader, the facsimile (FAX) and the like connected to the peripheral I/O part 50 may be stored in the power data memory 15. It should be noted that letters aa to ff shown in the FIG. 5 respectively indicate power consumptions (the values).

The power data memory 15 also stores information on usage history of the respective parts in the image forming apparatus 1, for example, information on usage frequencies of the parts in the image forming apparatus 1.

The power computational part 18, which is an example of a calculating part, has a function that estimates power consumption of the image forming apparatus 1 when the operational pattern for the operational mode is applied. In other words, when the operational pattern for the operational mode indicated by the application software is applied for example, the power computational part 18 computes the power consumption to be predicted (predicted power consumption), using information on the operational pattern for the operational mode stored in the applied pattern memory 16, information on power consumption per unit time of the image forming apparatus 1 in each operational mode stored in the power data memory 15, and information on the first time period and the second time period counted by the operational mode shift timer management part 14. Then, the information on the predicted power consumption that has been calculated is transmitted to the display controller 19.

The power computational part 18 is an example of the changing part and also, when an input to change the operational pattern described below is performed, has a function that processes the changed information that has been received and creates a new operational pattern. Then, the power computational part 18 transmits the new operational pattern that has been created to the applied pattern memory 16 to store it therein.

The display controller 19 acquires information on the predicted power consumption from the power computational part 18. Then, the display controller 19 interprets the information on the predicted power consumption so that the predicted power consumption computed by the power computational part 18 is displayed on the operation input display panel 60.

The display controller 19 further acquires information on the operational pattern from the applied pattern memory 16. Based on the information on the operational pattern, the display controller 19 creates a pattern image that represents the operational pattern by associating the time slots with the operational mode levels.

Furthermore, when receiving an input to change the operational pattern and the like by the user via the operation input display panel 60, the display controller 19 transmits the changed information and the like received to the power computational part 18.

Figure 6:
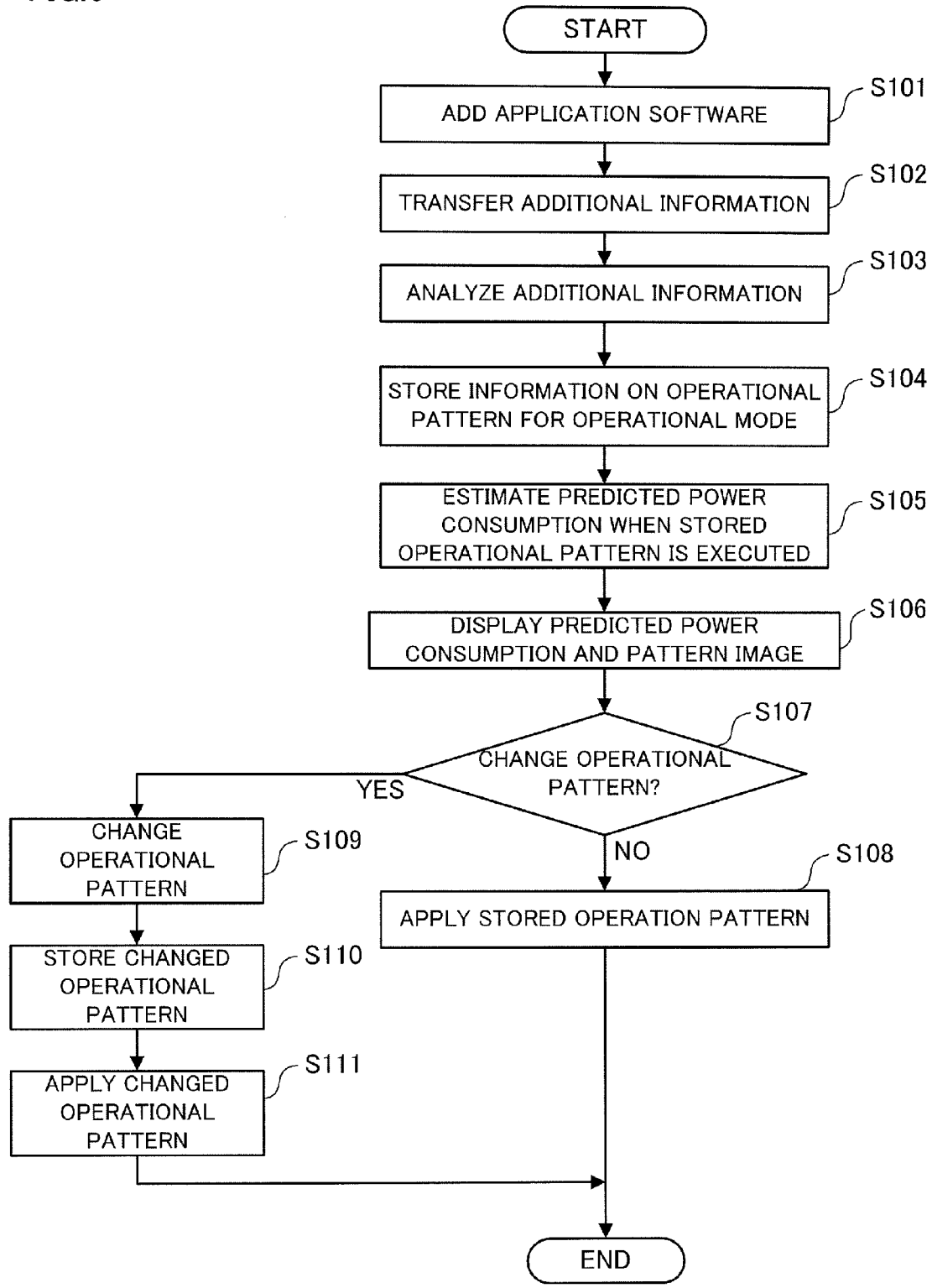
FIG. 6 is a flowchart showing an example of the procedure for controlling the operational modes by the controller.

The procedure for controlling the operational modes by the controller 10 is described. FIG. 6 is a flowchart showing an example of the procedure for controlling the operational modes by the controller 10. As shown in FIG. 6, when application software is added to the external memory 70 (S101), an application management unit 11 transfers the additional information included in the added application software to an additional information interpretation unit 12 (S102).

The additional information interpretation unit 12 analyzes the acquired additional information (S103). Based on the result of the analysis, the additional information interpretation unit 12 extracts operational patterns for operational modes indicated by the application software.

Then, information on the operational pattern for the operational mode that has been extracted based on the result of the analysis of the additional information in the step 103, is transferred to an applied pattern memory 16 and is stored therein (S104).

Once the information on the operational pattern for the operational mode is stored in the applied pattern memory 16, the power computational unit 18 estimates power consumption predicted to be consumed (predicted power consumption) in the image forming apparatus 1 when the operational pattern stored in the applied pattern memory 16 is executed (S105). More specifically, the power computational unit 18 acquires the information on the operational pattern for the operational mode from the applied pattern memory 16. The power computational unit 18 also acquires the information on the power consumption per unit time in the image forming apparatus 1 in each operational mode from the power data memory 15. Then, the power computational unit 18 computes the predicted power consumption when each of the operational patterns stored in the applied pattern memory 16 is executed using, for example, information on the operational pattern for the operational mode shown in FIG. 4 and information on the power consumption per unit time in each operational mode shown in FIG. 5.

The power computational unit 18 also transfers the information on the predicted power consumption that has been calculated to the display controller 19.

The display controller 19 acquires the information on the predicted power consumption from the power computational unit 18. The display controller 19 also acquires the information on the operational patterns from the applied pattern memory 16 and, based on the information on the operational patterns, creates a pattern image that expresses the operational patterns by associating the time slots with the operational mode levels. The display controller 19 displays the predicted power consumption that has been estimated, the pattern image for the operational patterns and the like on the operation input display panel 60 (S106).

Figure 7:
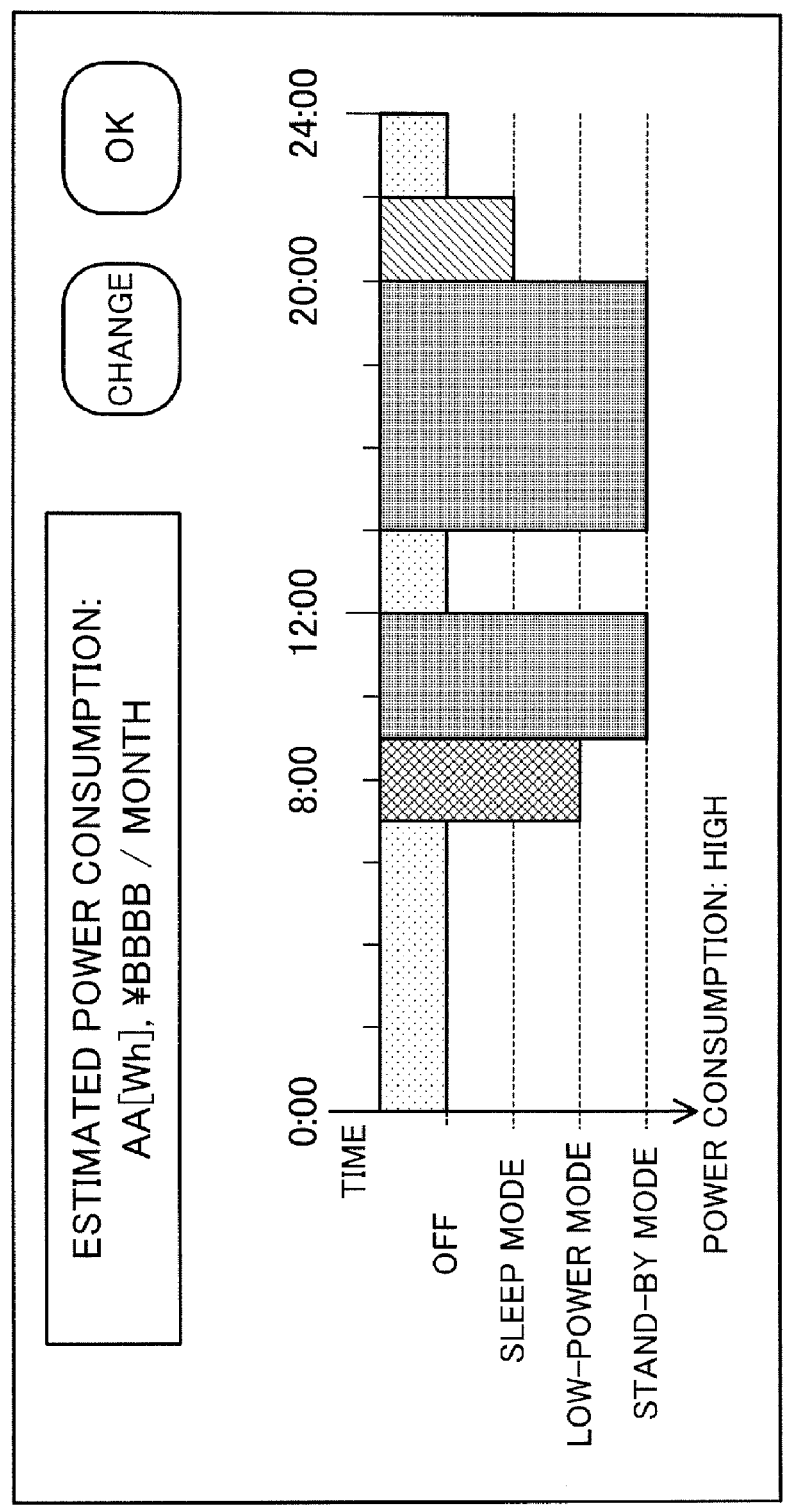
FIG. 7 is a diagram showing an example of the displayed information on the operation input display panel of the first exemplary embodiment.

FIG. 7 is a diagram showing an example of the displayed information on the operation input display panel 60 of the first exemplary embodiment. As shown in FIG. 7, on the operation input display panel 60, the predicted power consumption that has been estimated (estimated power consumption), the pattern image that represents the operational pattern stored in the applied pattern memory 16 by associating the time slots with the operational mode levels, an "OK" input area for accepting the displayed operational pattern, and a "CHANGE" input area for changing the displayed operational pattern. It should be noted that, in FIG. 7, monthly power consumption as the estimated power consumption and corresponding power bill are displayed. Alternatively, the unit period for calculating the estimated power consumption may be set arbitrarily, for example set on a yearly basis.

The user decides whether or not to execute the displayed operational pattern, based on the estimated power consumption and the pattern image of the operational pattern displayed on the operation input display panel 60 (S107). Then, if the user decides to execute the displayed operational pattern, the user inputs "OK" by touching the "OK" input area.

In this case, the power controller 17 acquires the information on the operational pattern for the operational mode from the applied pattern memory 16. The power controller 17 controls power supply to the respective parts incorporated in the image forming apparatus 1 from the power supplying part 80 so that the operational mode set for each of the time slots is applied based on the acquired information on the operational pattern for the operational mode (S108).

Since the operational pattern for the operational mode applied by the power controller 17 is suitable for the effective execution of the added application software, the added application software effectively functions in the set operational mode.

On the other hand, if the user decides to change the operational pattern displayed on the operation input display panel 60 in step 107, the user inputs it by touching in the "CHANGE" input area.

In this case, the display controller 19 receives the input to change the operational pattern by the user via the operation input display panel 60. Then, the display controller 19 transmits the changed information that has been received to the power computational part 18. The power computational part 18 processes the changed information that has been received and creates a new operational pattern that has been changed (S109). Then, the power computational part 18 transmits the new operational pattern that has been created to the applied pattern memory 16 to store it therein (S110). At the same time, the power computational part 18 informs the power controller 17 that the operational pattern stored in the applied pattern memory 16 is changed.

By changing the operational pattern in such a way, the operational pattern may be customized so as to satisfy the user's needs such as giving priority to power saving.

When receiving the information in which the operational pattern is changed, the power controller 17 acquires the information on the new operational pattern that has been changed from the applied pattern memory 16. Then, the power controller 17 controls power supply to the respective parts in the image forming apparatus 1 from the power supplying part 80 so that the operational modes assigned to each of the time slots is applied according to the acquired information on the new operational pattern for the operational mode (S111).

As described above, in the image forming apparatus 1 of the first exemplary embodiment, when the application software is added, the controller 10 analyzes the additional information provided in the application software and extracts the operational pattern indicated by the application software for the operational mode. Then, the controller 10 controls power supply to the respective parts in the image forming apparatus 1 from the power supplying part 80 according to the information on the extracted operational pattern for the operational mode. In this way, applying the power-saving mode in which the application software functions effectively is achieved.

Second Exemplary Embodiment

Described in the first exemplary embodiment is a configuration of the image forming apparatus 1 where the predicted power consumption that is predicted to be consumed in the image forming apparatus 1 is estimated, the information for the predicted power consumption that has been estimated and the like is displayed on the operation input display panel 60, and changing the operational pattern is received so as to satisfy the user's needs based on the displayed information, in executing the operational pattern for the operational mode indicated by the application software. Described in the second exemplary embodiment is a configuration where the operational pattern for the operational mode indicated by the application software is executed with no change. It should be noted that the same symbols are used as those in the first exemplary embodiment for the configuration similar to the first exemplary embodiment and that detailed descriptions are omitted.

Figure 8:
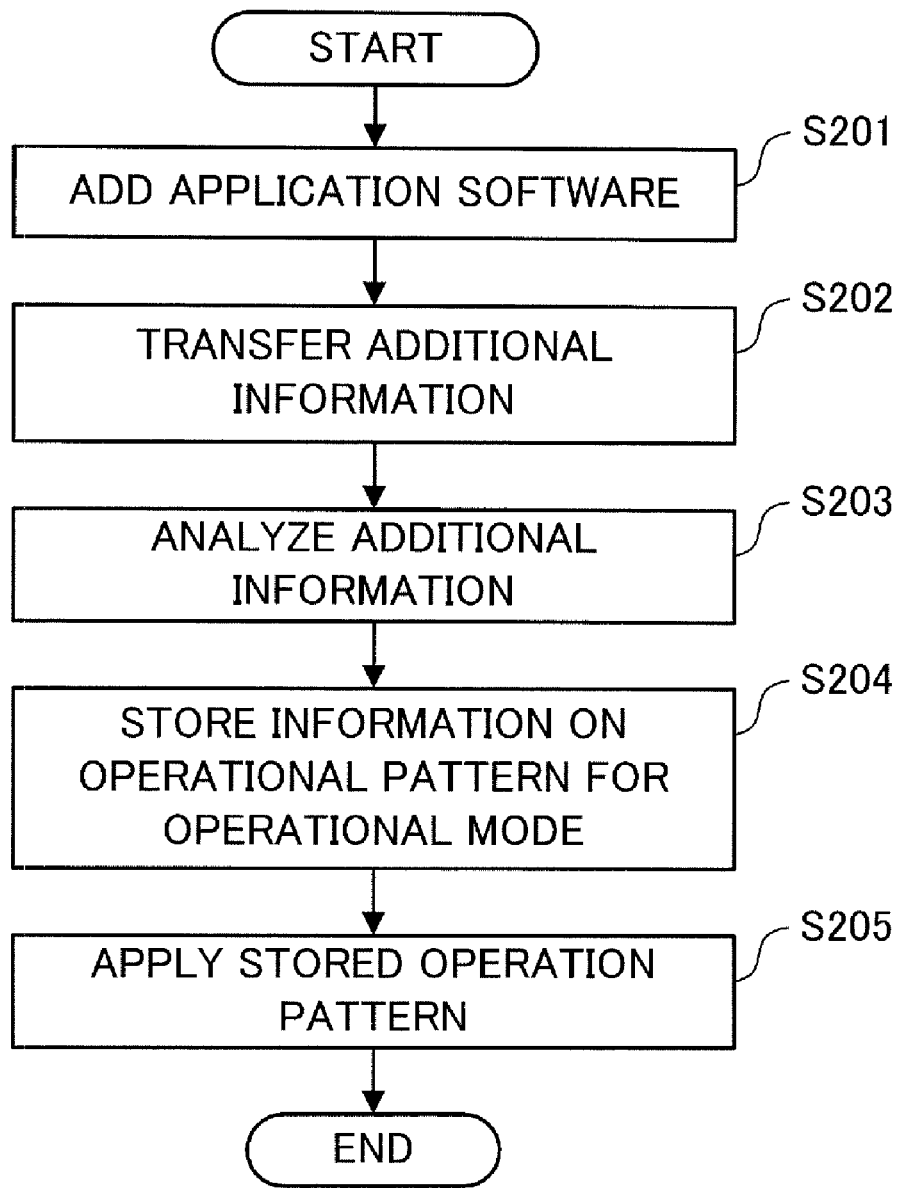
FIG. 8 is a flowchart showing an example of the procedure for controlling the operational modes by the controller of the second exemplary embodiment.

A description is given of controlling the operational modes by the controller 10 of the second exemplary embodiment. FIG. 8 is a flowchart showing an example of the procedure for controlling the operational modes by the controller 10 of the second exemplary embodiment. As shown in FIG. 8, when application software is added to the external memory 70 (S201), the application management unit 11 transfers the additional information included in the added application software to an additional information interpretation unit 12 (S202).

The additional information interpretation unit 12 analyzes the acquired additional information (S203). Based on the result of the analysis, the additional information interpretation unit 12 extracts operational patterns for operational modes indicated by the application software.

Then, information on the operational pattern for the operational mode that has been extracted based on the result of the analysis of the additional information in the step 203, is transferred to the applied pattern memory 16 and is stored therein (S204).

Once the information on the operational pattern for the operational mode is stored in the applied pattern memory 16, the power controller 17 acquires the information on the operational pattern for the operational mode from the applied pattern memory 16. Then, the power controller 17 controls power supply to the respective parts in the image forming apparatus 1 from the power supplying part 80 so that the application software, on start-up, applies the operational mode assigned to each of the time slots according to the acquired information on the operational pattern for the operational mode (S205).

In this case, control of power supply in the step 205 may be performed in such a way that the power controller 17, on start-up of the application software, acquires the information on the operational pattern for the operational mode from the applied pattern memory 16 and automatically sets the operational mode assigned to each of the time slots based on the acquired information on the operational pattern for the operational mode. Alternatively, the power controller 17 may acquire the information on the operational pattern for the operational mode from the applied pattern memory 16 and set the operational mode assigned to each of the time slots based on the command inputted by the user.

Furthermore, for example, when plural pieces of application software are running, it may be configured such that the operational mode with the highest power consumption is assigned to each of the time slots among the operational patterns of operational modes on the plural pieces of application software to avoid problems in the operation of the normally running application software.

As described above, in the image forming apparatus 1 of the second exemplary embodiment, when the application software is added, the controller 10 analyzes the additional information provided in the application software and extracts the operational pattern indicated by the application software for the operational mode. Then, the controller 10 controls power supply to the respective parts in the image forming apparatus 1 from the power supplying part 80 according to the information on the extracted operational pattern for the operational mode. Thereby, applying the power-saving mode in which the application software functions effectively is achieved.

Third Exemplary Embodiment

Described in the first exemplary embodiment is a configuration of the image forming apparatus 1 where the information on the estimated power consumption is displayed on the operation input display panel 60, and changing operational pattern is received based on the displayed information so as to satisfy the user's needs in executing the operational pattern for the operational mode indicated by the application software. Described in the third exemplary embodiment is a configuration where a new operational pattern that achieves the power consumption lower than that at a user's target level is created based on the operational pattern indicated by the application software in executing the operational pattern for the operational mode indicated by the application software when the estimated power consumption is higher than that at the user's target level. It should be noted that the same symbols are used as those in the first exemplary embodiment for the configuration similar to the first exemplary embodiment and that detailed descriptions are omitted.

The controller 10 of the third exemplary embodiment displays various kinds of information described below on the operation input display panel 60 in addition to the estimated power consumption in the step 106 of a process flowchart shown in FIG. 6 of the first exemplary embodiment.

Figure 9:
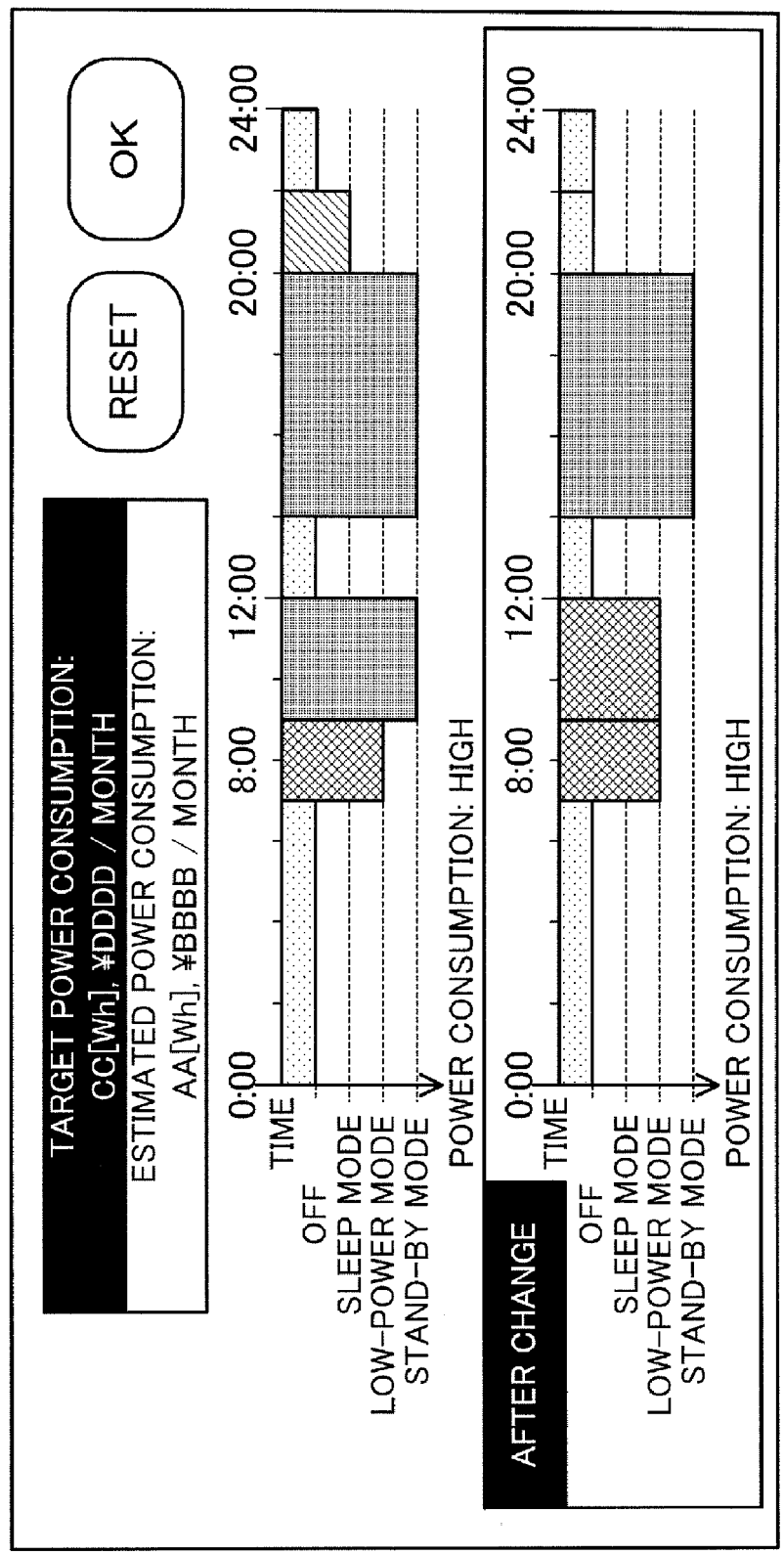
FIG. 9 is a diagram showing an example of the information displayed on the operation input display panel of the third exemplary embodiment.

FIG. 9 is a diagram showing an example of the information displayed on the operation input display panel 60 of the third exemplary embodiment. As shown in FIG. 9, the operation input display panel 60 of the third exemplary embodiment receives the inputted user's target power consumption (hereinafter, simply referred to as target power consumption) in a given term (for example, on a monthly basis) Then, the operation input display panel 60 displays the inputted target power consumption thereon.

As in the first exemplary embodiment, the operation input display panel 60 displays both the estimated power consumption in executing the operational pattern indicated by the application software and the pattern image that expresses operational pattern stored in an applied pattern memory 16 by associating the time slots with the operational mode levels.

When the target power consumption is inputted via the operation input display panel 60, the display controller 19 transfers information on the inputted target power consumption to the power computational part 18. The power computational part 18 acquires the information on the target power consumption and compares the acquired target power consumption with the estimated power consumption in executing the operational pattern indicated by the application software. Then, if the estimated power consumption is higher than the target power consumption, the power computational part 18 creates a new operational pattern that makes the estimated power consumption equal to or lower than the target power consumption based on the operational pattern indicated by the application software.

The created new operational pattern is transferred to the display controller 19 from the power computational part 18. Then, the display controller 19 creates a pattern image that expresses the new operational pattern by associating the time slots with the operational mode levels. The created pattern image is displayed on the operation input display panel 60 together with the aforementioned information.

The display controller 19 also computes the estimated power consumption in executing the changed new operational pattern and updates a display of estimated power consumption on the operation input display panel 60 based on an estimated power consumption newly computed.

In this case, the power computational part 18 creates the new operational pattern based on the operational pattern indicated by the application software. The new operational pattern may be created, for example, in such a way that the operational mode with lower power consumption by one level is re-assigned to the time slot that has been assigned the operational mode with the highest power consumption among the operational modes in the operational pattern indicated by the application software. The new operational pattern may also be created, for example, in such a way that the operational mode with lower power consumption by one level is re-assigned to the time slot that have been assigned the operational mode with the lowest power consumption other than the "OFF" mode among the operational pattern indicated by the application software. The new operational pattern may further be created, for example, in such a way that the number of time slots that have been assigned the operational modes other than the "OFF" mode is reduced according to a given rule, while the number of time slot that have been assigned the "OFF" mode is increased.

Thus, by adopting the operational pattern indicated by the application software as a standard, deterioration in functionality of the application software may be suppressed when the application software is operated.

In the subsequent steps after displaying the changed new operational pattern, the processing similar to the processing flowchart in FIG. 6 is performed. In other words, the user decides whether or not to execute the displayed operational pattern, based on the pattern image of the changed new operational pattern displayed on the operation input display panel 60 (step 107 in FIG. 6). Then, if the user decides to execute the displayed operational pattern, the user inputs "OK" by touching the "OK" input area.

In this case, the power computational part 18 stores information on the changed new operational pattern in the applied pattern memory 16. The power controller 17 acquires the information on the changed new operational pattern from the applied pattern memory 16. Then, the power controller 17 controls power supply to the respective parts incorporated in the image forming apparatus 1 from the power supplying part 80 so that the operational mode set for each of the time slots is applied based on the acquired information on the operational pattern for the operational mode (step 108 in FIG. 6).

The operational pattern for the operational mode applied by the power controller 17 satisfies the user's target power consumption. Since this operational pattern is set so that the added application software is effectively executed, the added application software may effectively function.

On the other hand, if the user decides to further change the changed new operational pattern displayed on the operation input display panel 60 in step 107 in FIG. 6, the user inputs the reset by touching the "reset" input area.

In this case, the display controller 19 receives the input to reset (change) the new operational pattern by the user via the operation input display panel 60. (step 109 in FIG. 6) Then, the display controller 19 transfers the received input of the reset to the power computational part 18. The power computational part 18 creates a new operational pattern with the lower power consumption assigned according to a given rule. Herein, the "given rule" includes, for example, such a rule in which the operational mode with lower power consumption by one level is re-assigned to the time slot that have been assigned the operational mode with the highest power consumption among the operational modes in the operational pattern indicated by the application software. Moreover, the given rule also includes, for example, such a rule in which the operational mode with lower power consumption by one level is re-assigned to the time slot that have been assigned the operational mode with the lowest power consumption other than the "OFF" mode among the operational modes in the operational pattern indicated by the application software. Furthermore, the "given rule" includes, for example, such a rule in which the number of the time slot that has been assigned the mode other than the "OFF" mode is reduced according to the given rule, while the number of the time slot that is assigned the "OFF" mode is increased.

The created newer operational pattern is transferred to the display controller 19 from the power computational part 18. The display controller 19 displays a pattern image that expresses another changed new operational pattern by associating the time slots with the operational mode levels on the operation input display panel 60 together with the aforementioned information. The power computational part 18 also computes the estimated power consumption and updates a current display of the estimated power consumption on the operation input display panel 60 based on an estimated power consumption newly computed. Then, the process flow returns to the step 107 in FIG. 6 to repeat the similar procedure.

In this case, there may be computed an estimated power consumption in executing the operational pattern for the operational mode before the addition of application software and the estimated power consumption may be displayed on the operation input display panel 60 for reference. At this time, in order to compute the estimated power consumption before the addition of application software, two kinds of information are used: information on usage history in the image forming apparatus 1 stored in the power data memory 15 (for example, information on usage frequencies of the units in the image forming apparatus 1); information on the power consumption per unit time in each of the operational modes.

A configuration may be adopted so that the operational pattern is selected when the user decides that the operational pattern for the operational mode before the addition of application software is preferable.

As described above, the controller 10 of the third exemplary embodiment changes the operational pattern indicated by the application software to another operational pattern with power consumption equal to or lower than the user's target power consumption based on its own operational pattern. This satisfies the target power consumption desired by the user and causes the added application software to effectively function.

Fourth Exemplary Embodiment

Described in the first exemplary embodiment is the case where one piece of application software is added. Described in the fourth exemplary embodiment is a case where plural pieces of application software are added. It should be noted that the same symbols are used as those in the first exemplary embodiment for the same configuration similar to the first exemplary embodiment and that detailed descriptions are omitted.

The procedure for controlling the operational modes by the controller 10 of the fourth exemplary embodiment is described below. In the fourth exemplary embodiment, plural pieces of application software are added to an external memory 70, each piece of application software includes own additional information including the operational pattern for operational mode indicated by the piece of application software.

Figure 10:
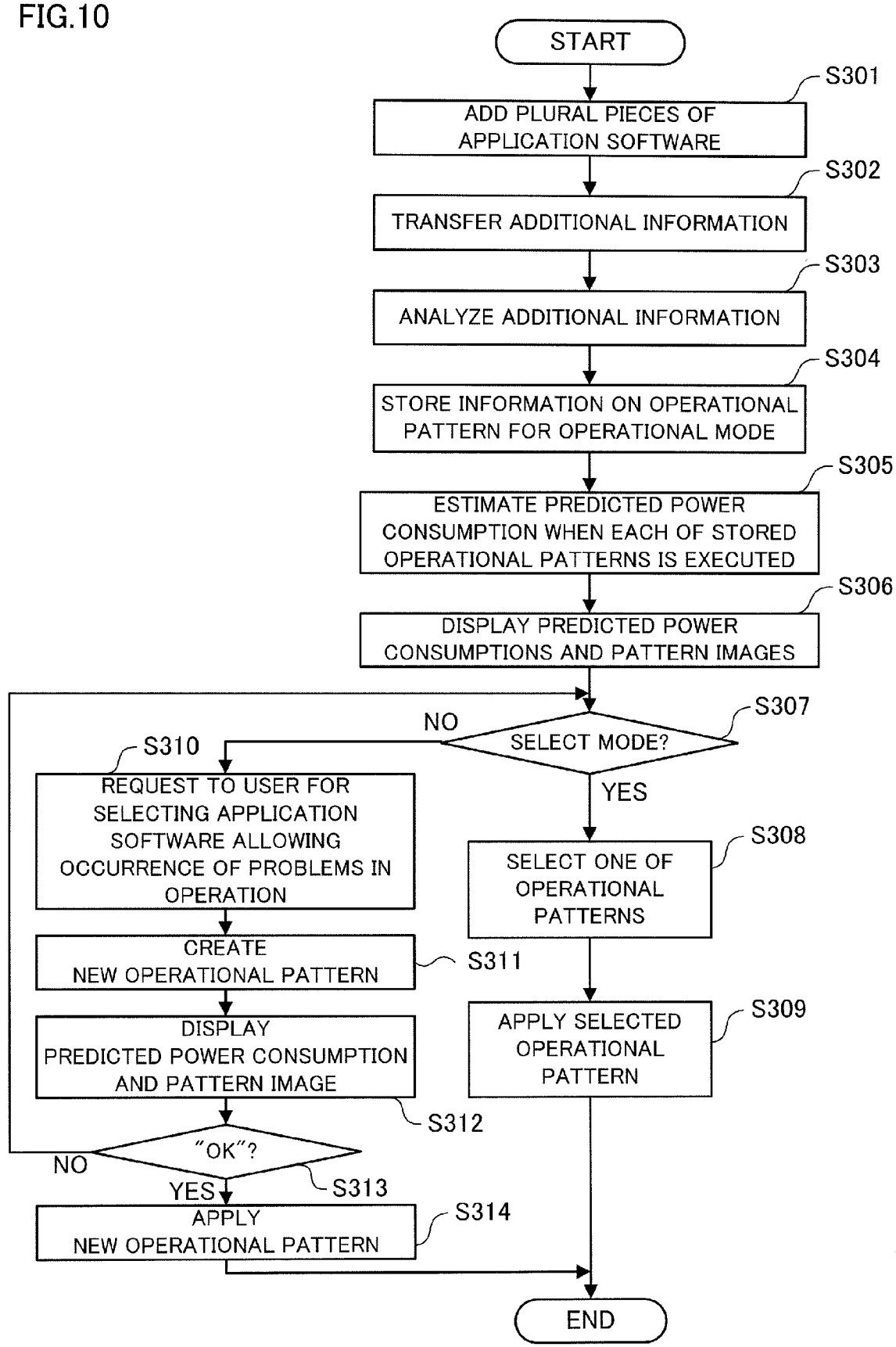
FIG. 10 is a flowchart showing an example of the procedure for controlling the operational modes by the controller.

FIG. 10 is a flowchart showing an example of the procedure for controlling the operational modes by the controller 10. As shown in FIG. 10, when plural pieces of application software are added to the external memory 70 sequentially or simultaneously (S301), an application management unit 11 transfers the additional information included in each of the added plural pieces of application software to an additional information interpretation unit 12 (S302).

The additional information interpretation unit 12 analyzes the acquired plural pieces of additional information (S303). Based on the result of the analysis, the additional information interpretation unit 12 extracts operational patterns of operational modes indicated by each of the plural pieces of application software.

Then, information on the operational patterns of operational modes that has been extracted based on the result of the analysis of the additional information in the step 303, is transferred to an applied pattern memory 16 and is stored therein (S304).

Once the information on the operational patterns of operational modes is stored in the applied pattern memory 16, the power computational unit 18 estimates power consumption predicted to be consumed (predicted power consumption) in the image forming apparatus 1 when each of the operational patterns stored in the applied pattern memory 16 is executed (S305). More specifically, the power computational unit 18 acquires the information on the operational pattern for each of the plural pieces of application software from the applied pattern memory 16. The power computational unit 18 also acquires the information on the power consumption per unit time in the image forming apparatus 1 in each operational mode from the power data memory 15. Then, the power computational unit 18 computes the predicted power consumption when each of the operational patterns stored in the applied pattern memory 16 is executed using, for example, information on each of the operational patterns and information on the power consumption per unit time in each operational mode.

The power computational unit 18 also transfers the information on the predicted power consumption for each of the operational patterns to the display controller 19.

The display controller 19 acquires the information on the predicted power consumption from the power computational unit 18. The display controller 19 also acquires the information on each of the operational patterns from the applied pattern memory 16 and, based on the information on each of the operational patterns, creates a pattern image that expresses each of the operational patterns by associating the time slots with the operational mode levels. The display controller 19 displays the predicted power consumption that has been estimated, the pattern image for each of the operational patterns and the like on the operation input display panel 60 (S306).

Figure 11:
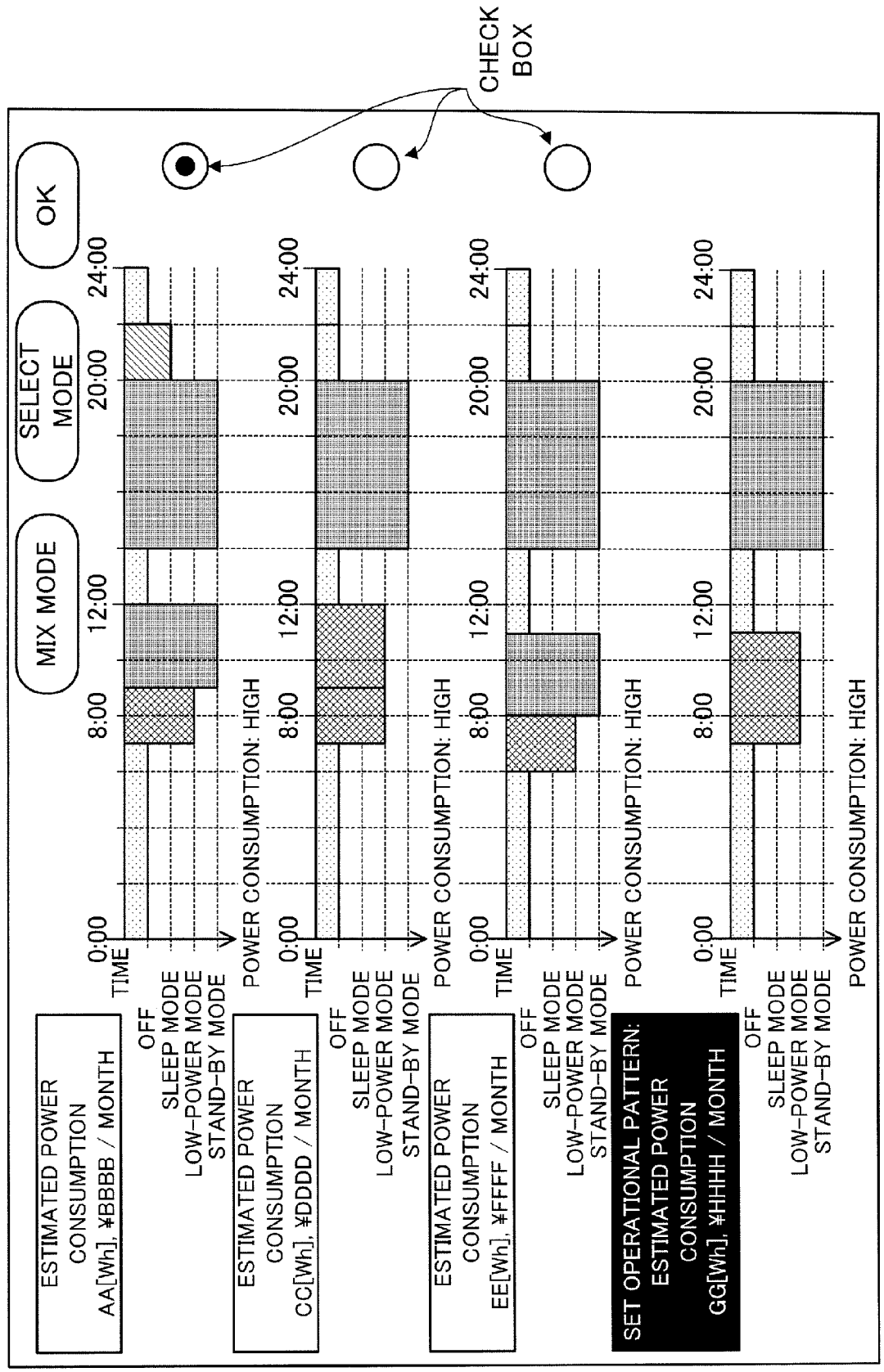
FIG. 11 is a diagram showing an example of information displayed on the operation input display panel of the fourth exemplary embodiment.

FIG. 11 is a diagram showing an example of information displayed on the operation input display panel 60 of the fourth exemplary embodiment. As shown in FIG. 11, displayed on the operation input display panel 60 are the predicted power consumption estimated for each of the operational patterns (estimated power consumption), the pattern image that expresses each of the operational patterns stored in the applied pattern memory 16 and the like by associating the time slots with the operational mode levels, a "mix mode" select area and a "select mode" select area that allow selecting a method for creating a new operational pattern from each of the displayed operational patterns, a check box that allows selecting any one of operational patterns when the "select mode" is selected, and an "OK" input area for approving the displayed operational pattern.

Based on the estimated power consumption for each of plural pieces of application software and the pattern image of respective operational patterns on the operation input display panel 60, the user decides which of the two modes to select: the "select mode" for selecting any one of plural operational patterns that are displayed or; the "mix" mode creating a new operational pattern by combining the plural operational patterns that are displayed (S307).

When the user decides to apply the "select mode" in the step 307, the user makes a check in the check box to specify an operational pattern to be selected. Thereby, any one of the operational patterns is selected (S308).

In this case, the power controller 17 acquires the information on the selected operational pattern from the applied pattern memory 16. The power controller 17 controls power supply to the respective parts incorporated in the image forming apparatus 1 from the power supplying part 80 so that the operational mode set for each of the time slots is applied based on the acquired information on the operational pattern for the operational mode (S309).

Thus, by selecting one of the operational patterns, specific application software may preferentially function.

On the other hand, when the user decides to apply the "mix mode" in the step 307, the power computational unit 18 creates a new operational pattern according to the given rule based on the operational pattern for each of plural pieces of application software. For example, the power computational unit 18 separates respective operational patterns for each of the time slots and requests the user to select application software that allows the occurrence of problems in the operation among plural pieces of those pieces of application software in normal operation in respective time slots (S310). Then, the power computational unit 18 creates a new operational pattern according to the rule in which the operational mode with the highest power consumption (lightest operational mode) is selected under the condition that the pieces of application software other than the selected application software allowing the occurrence of problems in the operation operate normally (S311). The new operational pattern that has been created is stored in the applied pattern memory 16. For the rule that is used in the case of creating a new operational pattern, various methods other than the aforementioned method may be used.

The new operational pattern that has been created is transferred to the display controller 19 from the power computational unit 18. The display controller 19 displays the pattern image serving as the new operational pattern by associating the time slots with the operational mode levels on the operation input display panel 60 together with the aforementioned information. The estimated power consumption is computed by the power computational unit 18 and is displayed on the operation input display panel 60 (S312).

If the user decides to execute the operational pattern displayed on the operation input display panel 60 in the step 312, and inputs "OK" by touching the "OK" input area (S313), the new operational pattern is applied (S314). In other words, the power controller 17 acquires the information on the new operational pattern from the applied pattern memory 16. Then, the power controller 17 controls power supply to the respective parts incorporated in the image forming apparatus 1 from the power supplying part 80 so that the operational mode set for each of the time slots is applied based on the acquired information on the operational pattern for operational mode.

Since the operational pattern for operational mode applied by the power controller 17 is set based on the operational pattern that allows each of plural pieces of application software to function effectively, the plural pieces of application software that has been added may effectively function.

On the other hand, if the user decides not to execute the operational pattern displayed on the operation input display panel 60 in the step 312 and does not input "OK" by touching the "OK" input area (S313), the process flow returns to the step 307 and the user is requested to decide to execute the "select mode" or "mix mode" again.

As described above, when plural pieces of application software are added, the controller 10 of the fourth exemplary embodiment creates a new operational pattern from the operational pattern assigned to each of the plural pieces of application software or selects any one of the plural operational patterns. Thereby, whether the specific pieces of application software are preferentially functioned or each of the plural pieces of application software is allowed to function effectively is set.

Fifth Exemplary Embodiment

Described in the first exemplary embodiment is a case where the controller 10 to which the present invention is applied is provided in the image forming apparatus 1 that has a large number of operational modes. Described in the fifth exemplary embodiment is a case where the controller 10 to which the present invention is applied is provided in the image forming apparatus in which two operational modes are set. It should be noted that the same symbols are used in the configuration similar to the first exemplary embodiment and that detailed descriptions are omitted.

Figure 12:
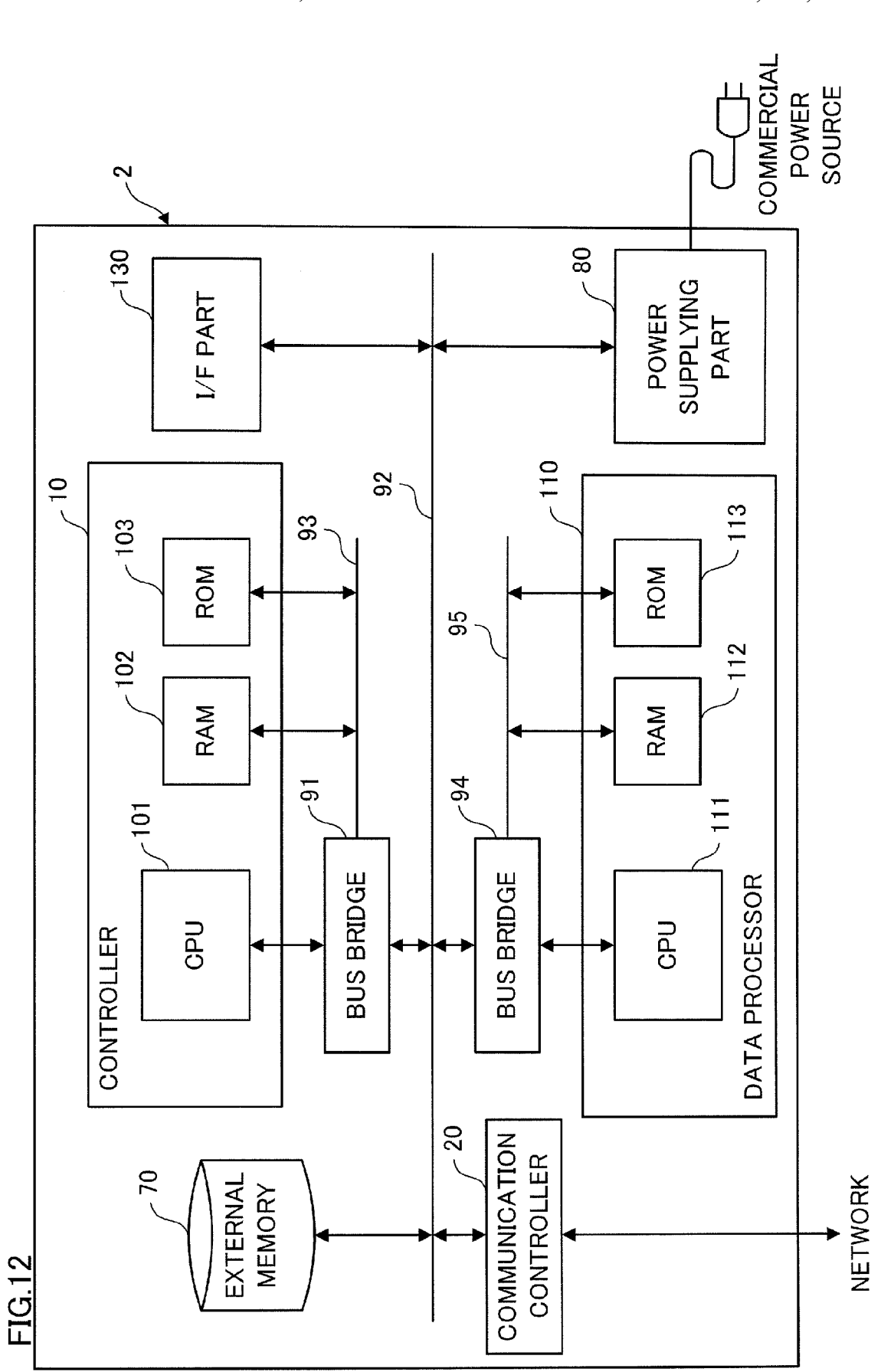
FIG. 12 is a diagram showing an overall configuration of an information processing apparatus equipped with a controlling apparatus to which the fifth exemplary embodiment is applied.

FIG. 12 is a diagram showing an overall configuration of an information processing apparatus equipped with a controlling apparatus to which the fifth exemplary embodiment is applied. An information processing apparatus 2 shown in FIG. 12 is a personal computer (PC) for example, and is provided with a controller 10 as an example of a controlling apparatus (a controlling device) that controls the operation of the information processing apparatus 2 according to various programs, and a communication controller 20 that controls communication with a network. The information processing apparatus 2 is also provided with a data processor 110 as an example of an information processor that executes various processings (information processing) by various kinds of application software for data and the like transferred from, for example, a terminal apparatus via the network.

The information processing apparatus 2 has an interface (I/F) part 130. Connected to the I/F part 130 are various functional units: input devices that receive various data inputted by the user such as pointing devices, for example, a keyboard, a mouse and the like; a display, for example, a liquid crystal display, and the like. The information processing apparatus 2 transfers input signals from an input device to the controller 10 and a data processor 110. The information processing apparatus 2 also transfers data from the data processor 110 to a display and the like.

Furthermore, similar to the image forming apparatus 1 of the first exemplary embodiment, the information processing apparatus 2 has an external memory 70, a power supplying part 80, and a bus bridge 91.

The data processor 110 is connected to the information processing apparatus 2 via an external bus 92 via a bus bridge 94. Accordingly, the data processor 110 is connected to the controller 10, the communication controller 20, the I/F part 130 and the external memory 70 so as to receive and transfer signals and data with each other.

As shown in FIG. 11, the data processor 110 has a CPU 111 that performs computation processing in executing various pieces of application software, a RAM 112 that is used as a working memory for the CPU 111 and the like, and a ROM 113 that stores various pieces of application software executed by the CPU 111. The CPU 111, the RAM 112, and the ROM 113 are connected to each other via an internal bus 95 connected to the bus bridge 94.

The various pieces of application software executed by the data processor 110 are supplied by loaded to the ROM 113 from a hard disk and the like serving as the external memory 70, for example, on start-up of the information processing apparatus 2. Alternatively, the application software may be supplied in such a way that the application software is stored in advance in the ROM 113. Moreover, the application software may be supplied in such a way that only the programs are supplied and installed in the ROM 113 after the data processor 110 is assembled when the information processing apparatus 2 has the rewritable ROM 113 such as an EEPROM. Furthermore, the application software may be supplied in such a way that the programs are transmitted to the data processor 110 via a network such as the Internet, and installed in the ROM 113 of the data processor 110.

Next, the operational modes, which are set in the information processing apparatus 2 of the fifth exemplary embodiment is described. The information processing apparatus 2 is configured so that the "operating mode" or "stand-by" mode is set as the operational mode to improve power saving effect.

The operating mode is such an operational mode in which various processes are executed on data and the like or inputting data and the like is processed on demand. In the operating mode, power is supplied to all the functional units incorporated in the information processing apparatus 2 from the power supplying part 80.

The stand-by mode is an operational mode that is set when no data is inputted for a given time period. In the stand-by mode, power supply to, for example, the data processor 110, the communication controller 20, and the I/F part 130 from the power supplying part 80 is interrupted.

Figure 13:
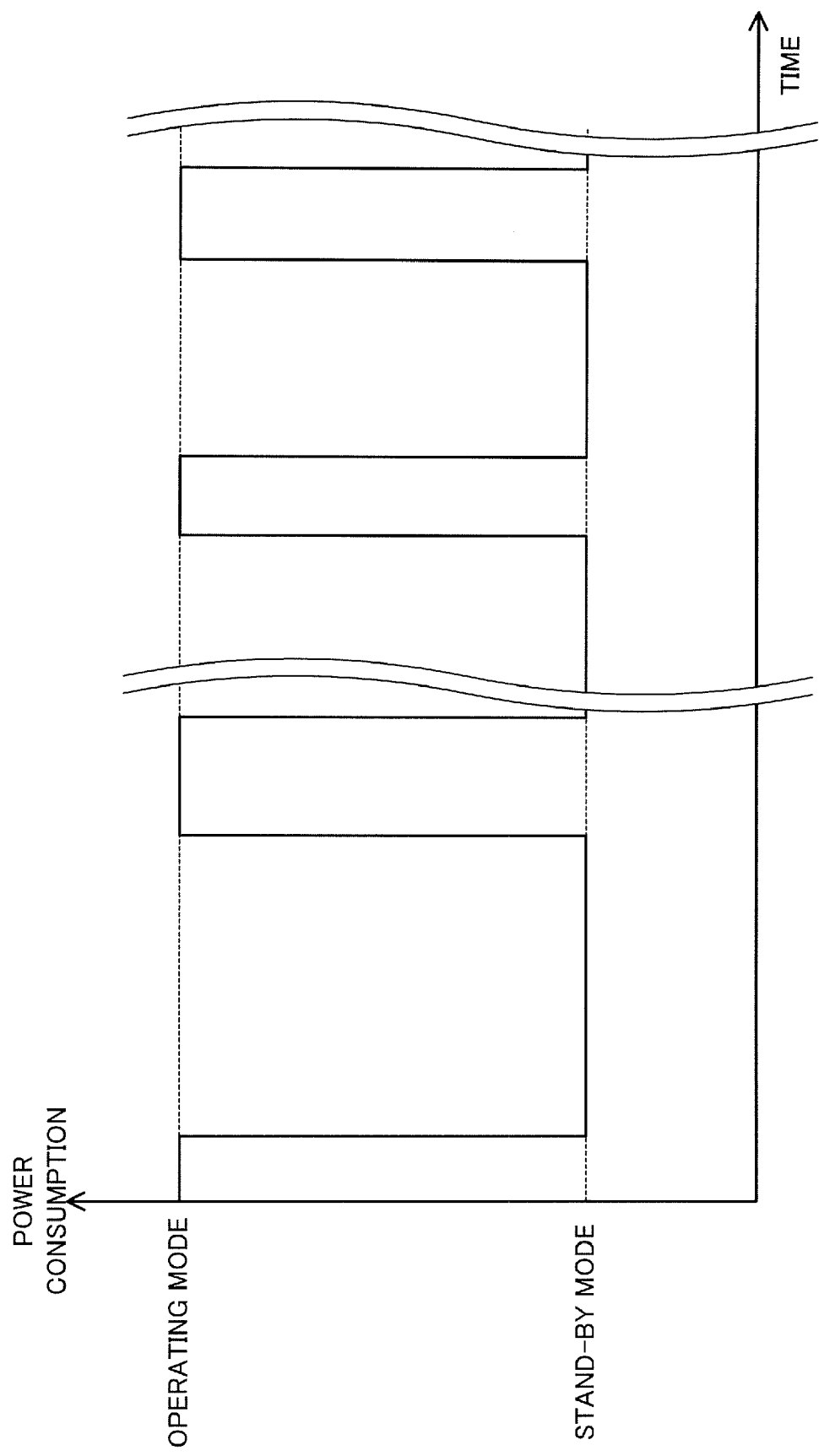
FIG. 13 is a diagram explaining the operational modes set in the information processing apparatus.

FIG. 13 is a diagram explaining the operational modes set in the information processing apparatus 2. As shown in FIG. 13, in the information processing apparatus 2, the operational mode in which a larger amount of power necessary for data processing is consumed, or the stand-by mode with a less amount of power consumed, is set. Accordingly, the power-saving effect is improved in the information processing apparatus 2.

In the image forming apparatus 2 of the fifth exemplary embodiment, the controller 10 has a configuration similar to that shown in FIG. 3. Once a new piece of application software that is executed at the data processor 110 is added to the information processing apparatus 2, an operational pattern for operational mode indicated by the added application software is executed. By performing a process similar to that shown in FIG. 6, the information processing apparatus 2 may operate in the power-saving status so that the added application software effectively functions in executing the added application software in the data processor 110.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A controlling apparatus comprising:
a memory that stores application software;
a setting part that sets an operational manner related to power consumption of an apparatus running the application software, corresponding to the application software stored in the memory; and
a controller that controls the power consumption of the apparatus according to the operational manner set by the setting part,
wherein the controller controls the power consumption of the apparatus in each of a plurality of time slots to refrain the power consumption from becoming lower than a power consumption of the operational manner set in the setting part.

2. The controlling apparatus according to claim 1, wherein the setting part sets at least one of the operational manner included in the application software and the operational manner indicated by additional information added to the application software.

3. The controlling apparatus according to claim 1, further comprising:
a change receiving part that receives a change of the operational manner included in the application software or a change of the operational manner indicated by additional information added to the application software, wherein
the setting part changes and sets the operational manner according to contents of the change received by the change receiving part.

4. The controlling apparatus according to claim 1, wherein the setting part, with regard to a plurality of pieces of the application software stored in the memory, sets at least one of the operational manner for one of the pieces of application software selected among the plurality of pieces of application software, and a new operational manner created according to a predetermined rule based on the operational manners for the plurality of pieces of application software.

5. The controlling apparatus according to claim 1, further comprising a display controller that converts the operational manner set in the setting part to a pattern image expressing the operational manner by associating the time slots with operational states for display.

6. The controlling apparatus according to claim 1, further comprising:
an operational manner memory that stores a plurality of the operational manners which are respectively different in the apparatus running the application software, wherein
the setting part sets one of the plurality of operational manners stored in the operational manner memory corresponding to the application software.

7. The controlling apparatus according to claim 6, wherein the setting part sets an operational manner with the highest power consumption among the plurality of operational manners stored in the operational manner memory, in each of the time slots.

8. A controlling apparatus comprising:
a memory that stores application software;
a setting part that sets an operational manner related to power consumption of an apparatus running the application software, corresponding to the application software stored in the memory;
a controller that controls the power consumption of the apparatus according to the operational manner set by the setting part;
a calculating part that calculates a predicted value for power consumption of the apparatus when the operational manner included in the application software or the operational manner indicated by the additional information added to the application software is executed; and
an instruction input receiving part that receives an instruction inputted by a user indicating whether or not to set the operational manner with the predicted value calculated by the calculating part, wherein
the setting part sets the operational manner when the instruction input receiving part receives the instruction inputted by the user to set the operational manner.

9. The controlling apparatus according to claim 8, further comprising:

a target value input receiving part that receives an input of a target value for power consumption of the apparatus running the application software in a predetermined time period; and a changing part that changes the operational manner included in the application software or the operational manner indicated by the additional information added to the application software to the operational manner with the predicted value equal to or lower than the target value when the predicted value calculated by the calculating part is larger than the target value received by the target value input receiving part, wherein the setting part sets the operational manner changed by the changing part instead of the operational manner included in the application software or the operational manner indicated by the additional information added to the application software.

10. A controlling method comprising:

setting an operational manner related to power consumption of an apparatus running application software for the application software stored in a memory; and controlling the power consumption of the apparatus according to the set operational manner, wherein the controlling comprises controlling the power consumption of the apparatus in each of a plurality of time slots to refrain the power consumption from becoming lower than the power consumption of the set operational manner.

11. A computer readable medium storing a program causing a computer to execute a process for controlling power consumption, the process comprising:

setting an operational manner related to power consumption of an apparatus running application software for the application software stored in a memory; and controlling the power consumption of the apparatus according to the set operational manner, wherein the process of controlling the power consumption of the apparatus controls the power consumption of the apparatus in each of a plurality of time slots to refrain the power consumption from becoming lower than a power consumption of the set operational manner.

12. The computer readable medium according to claim 11, wherein the process of setting the operational manner in the apparatus sets at least one of the operational manner included in the application software and the operational manner indicated by additional information added to the application software.

13. The computer readable medium according to claim 11, further comprising:

receiving a change of the operational manner included in the application software or the operational manner indicated by additional information added to the application software, wherein the process of setting the operational manner of the apparatus sets the operational manner changed according to contents of the received change.

14. The computer readable medium according to claim 11, wherein the process of setting the operational manner in the apparatus sets one of a plurality of the operational manners stored in an operational manner memory that stores the plurality of operational manners which are respectively different in the apparatus running the application software for each of pieces of application software stored in the memory.

15. The computer readable medium according to claim 14, wherein the process of setting the operational manner in the apparatus sets an operational manner with the highest power consumption among the plurality of operational manners stored in the operational manner memory, in each of the time slots.

16. A computer readable medium storing a program causing a computer to execute a process for controlling power consumption, the process comprising:

setting an operational manner related to power consumption of an apparatus running application software for each of the application software stored in a memory;

controlling the power consumption of the apparatus according to the set operational manner;

calculating a predicted value for power consumption of the apparatus when the operational manner included in the application software or the operational manner indicated by additional information added to the application software is set;

displaying the predicted value on a display; and receiving an instruction inputted by a user indicating whether or not to set the operational manner with the predicted value, wherein the process of setting the operational manner in the apparatus sets the operational manner with the predicted value, when the instruction inputted by the user to set the operational manner is received.

17. The computer readable medium according to claim 16, further comprising:

receiving an input of a target value for power consumption of the apparatus running the application software in a predetermined time period; and changing the operational manner included in the application software or the operational manner indicated by the additional information added to the application software to the operational manner with the predicted value equal to or lower than the target value when the predicted value is larger than the target value, wherein the process of setting the operational manner in the apparatus sets the changed operational manner instead of the operational manner included in the application software or the operational manner indicated by the additional information added to the application software.

18. An image forming apparatus comprising:

a power supplying part that receives power supply from a commercial power source and supplies power with a predetermined voltage;

an image forming part that receives the power supply from the power supplying part and forms an image on a medium based on image data;

a functional part that receives the power supply from the power supplying part for functioning;

a controlling device that controls the power supplied from the power supplying part to the image forming part and the functional part; and a memory that stores application software causing one or more of the controlling device, the image forming part, and the functional part to operate according to a predetermined rule, the controlling device including:

a setting part that sets an operational manner related to the power supplied from the power supplying part corresponding to the application software stored in the memory; and a controller that controls the power supply from the power supplying part according to the operational manner set by the setting part, wherein the controller controls the power consumption of the apparatus in each of a plurality of time slots to refrain the power consumption from becoming lower than a power consumption of the operational manner set in the setting part.

19. An information processing apparatus comprising:
a power supplying part that receives power supply from a commercial power source and supplies power with a predetermined voltage;
an information processor that receives the power supply from the power supplying part and processes various kinds of information;
a functional part that receives the power supply from the power supplying part and functions according to the information processed by the information processor;
a controlling device that controls the power supplied from the power supplying part to the information processor and the functional part; and
a memory that stores application software causing the information processor to operate according to a predetermined rule,
the controlling device including:
a setting part that sets an operational manner related to the power supplied from the power supplying part corresponding to the application software stored in the memory; and
a controller that controls the power supply from the power supplying part according to the operational manner set by the setting part,
wherein the controller controls the power consumption of the apparatus in each of a plurality of time slots to refrain the power consumption from becoming lower than a power consumption of the operational manner set in the setting part.

* * * * *